United States Patent
Peng et al.

(10) Patent No.: US 8,351,133 B2
(45) Date of Patent: Jan. 8, 2013

(54) 360 DEGREE VIEWING ANGLE LENS UNIT AND OPTICAL LENS SYSTEM USING SAME

(75) Inventors: Fang-Ying Peng, Tapei Hsien (TW); Hai-Jo Huang, Taipei Hsien (TW); Sheng-An Wang, Taipei Hsien (TW); Xiao-Na Liu, Guangdong (CN); Jing Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 12/981,564

(22) Filed: Dec. 30, 2010

(65) Prior Publication Data

US 2012/0105980 A1 May 3, 2012

(30) Foreign Application Priority Data

Oct. 28, 2010 (CN) .......................... 2010 1 0523158

(51) Int. Cl.
*G02B 13/06* (2006.01)
*G02B 17/00* (2006.01)

(52) U.S. Cl. ......................... 359/725; 359/730; 359/731

(58) Field of Classification Search .................. 359/725, 359/730, 731
See application file for complete search history.

(56) References Cited

U.S. PATENT DOCUMENTS 8,072,693 B2 * 12/2011 Togino et al. ................. 359/725

* cited by examiner

*Primary Examiner* — William Choi
(74) *Attorney, Agent, or Firm* — Altis Law Group, Inc.

(57) ABSTRACT

A 360 degree viewing angle lens unit, from the object side to the image side thereof, includes a 360 degree viewing angle lens and a relay lens. The viewing angle lens includes an annular incident surface, a first reflective surface, a second reflective surface, and an emitting surface. The annular incident surface has a positive radius of curvature and symmetrically concentric around an optical axis of the lens unit. The first reflective surface has a positive radius of curvature and is symmetrically concentric around the optical axis. The second reflective surface has a negative radius of curvature, and is coaxial with the incident surface. The emitting surface has a positive radius of curvature and is coaxial with the first reflective surface. The relay lens has a positive refractive power and is aligned with the emitting surface. The relay lens is configured for condensing image light output from the emitting surface.

18 Claims, 1 Drawing Sheet

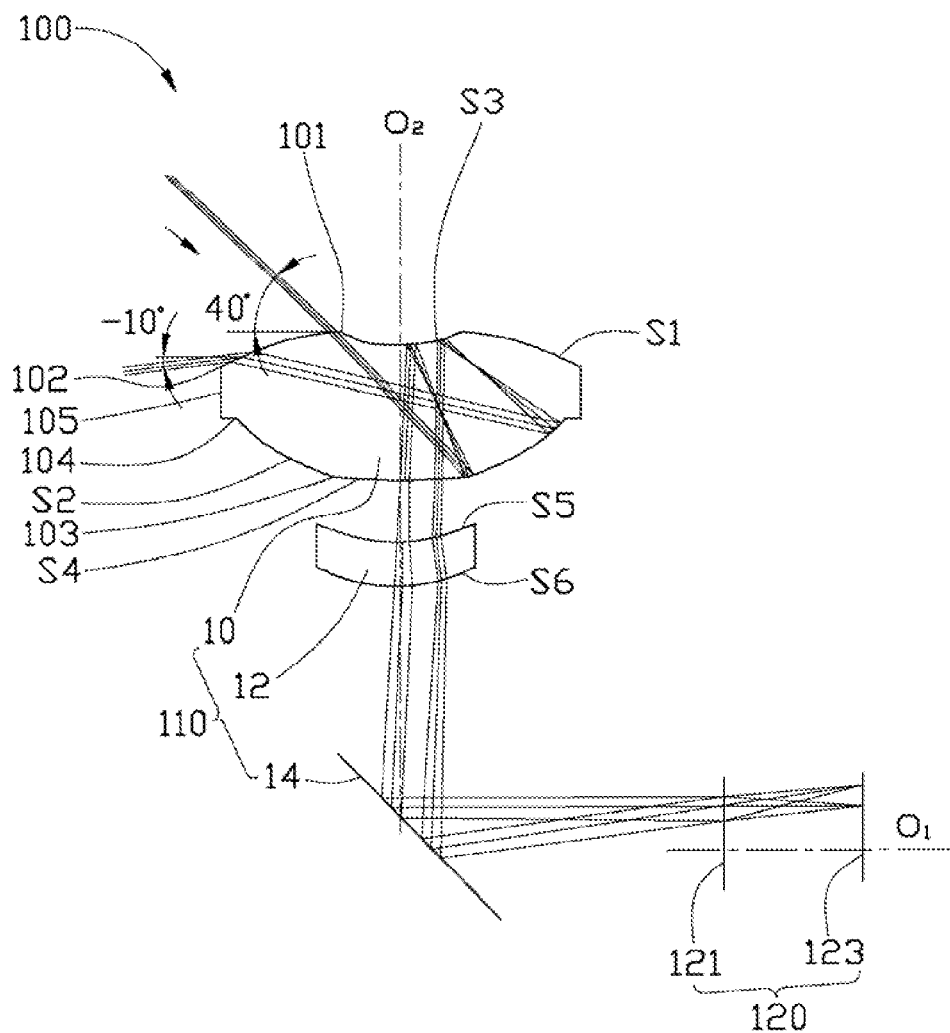

360 DEGREE VIEWING ANGLE LENS UNIT AND OPTICAL LENS SYSTEM USING SAME

BACKGROUND

1. Technical Field

The present disclosure relates to lens systems and, particularly, to a 360° viewing angle lens unit capable of imaging a lateral perspective of 360° circumference along the optical axis thereof, and an optical lens system utilizing the 360° viewing angle lens.

2. Description of Related Art

360° viewing angle lens systems are commonly used in a camera system for capturing images in full-360° angle-of-view. In a general 360° viewing angle lens systems, a 360° viewing angle lens is often arranged in front of a regular lens group along the optical axis of the regular lens group. As such, the regular lens group can collect the lights in front of the 360° viewing angle lens, while the 360° viewing angle lens can collect the image lights around the optical axis in a 360° circumference. However, in such an arrangement, the 360° viewing angle lens system may only capture an image including a front perspective along the optical axis of the regular lens group and another circumference perspective surrounding the optical axis of the regular lens group at the same time at most. It limits some special requirements for capturing images along different directions.

Therefore, it is desirable to provide a 360° viewing angle lens unit and an optical lens system using the 360° viewing angle lens, which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments.

The FIGURE is a schematic view of an exemplary embodiment of an optical lens system using a 360° viewing angle lens unit.

DETAILED DESCRIPTION

Embodiments of the present disclosure will now be described in detail below, with reference to the accompanying drawing.

Referring to the FIGURE, an optical lens system 100, according to an exemplary embodiment, is shown. In this embodiment, the optical lens system 100 is adapted to a digital camera. In other embodiments, the optical lens system 100 may be employed in a video camera, a projector, or a cell phone. The optical lens system 100 includes, from the object side to the image side, a 360° viewing angle lens unit 110 and a regular lens unit 120. The 360° viewing angle lens unit 110 is detachably connected to the regular lens unit 120 by connectors (not shown). A first optical axis O1 of the regular lens unit 120 is perpendicular to a second optical axis O2 of the 360° viewing angle lens unit 110.

The regular lens unit 120 includes a lens group (not shown) which forms an entrance pupil surface 121 which receives a light incident from the 360° viewing angle lens unit 110. The regular lens unit 120 further includes an image sensor 123 for sensing the light signals emitted from the lens group, and a number of necessary control components not shown in the figures. The central axis of the lens group forms the first optical axis O1. The image sensor 123, such as a charge coupled device (CCD), or a complementary metal oxide semiconductor (CMOS) is provided at the focus location of the lens group.

The 360° viewing angle lens unit 110 includes, from the object side to the image side, a 360° viewing angle lens 10, a relay lens 12, and a reflective element 14.

The 360° viewing angle lens 10 is made of a light permeable material, such as optical glass, or transparent resin. The 360° viewing angle lens 10 is symmetrically concentric around the second optical axis O2 and includes an annular incident surface S1, an annular first reflective surface S2, a circular second reflective surface S3, and a circular emitting surface S4. The incident surface S1 is externally symmetrically concentric to the first reflective surface S2, while the emitting surface S4 is externally symmetrically concentric to the second reflective surface S3. The incident surface S1 and the emitting surface S4 oppositely extend along the second optical axis O2.

Correspondingly, the annular incident surface S1 is symmetrically concentric around the second optical axis O2, and includes, from the object side to the image side of the lens unit 110, a first circular edge 101 and a second circular edge 102. The annular incident surface S1 tilts to the second optical axis O2 at a predetermined angle. The diameter of the first circular edge 101 is smaller than that of the second circular edge 102. With reference to a direction from the object side to the image side, the radius of the curvature of the annular incident surface S1 is positive. The annular incident surface S1 is a convex surface projecting to the object side along the second optical axis O2. Thus, image light from 360° around the surface can enter the annular incident surface S1 before entering the viewing angle lens 10. In the present embodiment, the image light emitted in an area formed as measured from −10° to 40° relative to a line perpendicular to the second optical axis O2, can hit the annular incident surface S1.

Note that in other embodiments, the annular incident surface S1 may be an extended rotation free-form surface that is formed by the rotation of a line segment of any shape about the second optical axis O2 of rotational symmetry.

The first reflective surface S2 is symmetrically concentric around the second optical axis O2, and includes, from the image side to the object side of the lens unit 110, a third circular edge 103 and a fourth circular edge 104. The first reflective surface S2 tilts to the second optical axis O2 at a predetermined angle, along a direction substantially opposite to the projecting direction of the incident surface S1. The diameter of the third circular edge 103 is smaller than that of the fourth circular edge 104. The diameter of the fourth circular edge 104 is substantially equal to that of the second circular edge 102. With reference to a direction from the object side to the image side, the radius of the curvature of the first reflective surface S2 is positive. The first reflective surface S2 is a convex surface projecting to the image side along the second optical axis O2. The outer surface of the first reflective surface S2 is coated with a reflective film for efficiently and sufficiently reflecting the image light from the first reflective surface S2 to the second reflective surface S3.

The second reflective surface S3 is symmetrically concentric around the second optical axis O2 and coaxial with the incident surface S1. The periphery of the second reflective surface S3 is joined together with the first circular edge 101 of the incident surface S1. The second reflective surface S3 also has a vertex on the second optical axis O2 of rotational symmetry. With reference to a direction from the object side to the image side, the radius of the curvature of the second reflective surface S3 is negative. The second reflective surface S3 is a concave surface which is closed to the image side along the second optical axis O2. The outer surface of the second reflective surface S3 is also coated with a reflective film for efficiently and sufficiently reflecting the image light from the second reflective surface S3 to the emitting surface S4.

The emitting surface S4 is symmetrically concentric around the second optical axis O2 and coaxial with the first reflective surface S2. The periphery of the emitting surface S4 is joined together with the third circular edge 103 of the first reflective surface S2. With reference to a direction from the object side to the image side, the radius of the curvature of the emitting surface S4 is positive. The emitting surface S4 is a convex surface projecting to the image side along the second optical axis O2. The emitting surface S4 is configured for refracting and focusing the image light reflected from the second reflective surface S3.

A connecting surface 105 shaped as a substantially plane is defined between the fourth circular edge 104 and the second circular edge 102. The diameter of the connecting surface 105 is larger than the diameter of the fourth circular edge 104 and the second circular edge 102.

The relay lens 12 has positive refractive power for condensing the image light output from the emitting surface S4. The relay lens 12 includes a first surface S5 concave toward the object side for light incident from the emitting surface S4 of the 360° viewing angle lens 10, and a second surface S6 also convex to the image side for light emitting to the reflective element 14. With reference to the direction from the object side to the image side, the radius of the curvature of the first surface S5 is negative, while the radius of the curvature of the second surface S6 is positive. Either one of the first surface S5 or the second surface S6 is aspheric. In this embodiment, the relay lens 12 is made of plastic, to lower the cost and weight.

The reflective element 14 is a mirror or a reflecting prism, and configured for reflecting the image light emitted from the relay lens 12 to the entrance pupil surface 121 of the regular lens unit 120. In this embodiment, the reflective element 14 is a mirror. The angle between the first optical axis O1 and a reflective surface of the reflective element 14 is 45°, the same as that between the second optical axis O2 and the reflective surface. In other embodiments, the angle between the first optical axis O1 or the second optical axis O2 and the reflective surface may not be limited in 45°, but can be alternated as, e.g. 30° or 60°.

The image light is refracted into the interior of the 360° viewing angle lens 10 at a random point on the annular incident surface S1 and then is reflected on the first reflective surface S2. The light reflected from the first reflective surface S2 is further reflected by the second reflective surface S3 to the emitting surface S4. The relay lens 12 condenses the light emitted from the emitting surface S4. Then the light is further reflected by the reflective element 14. As a result, the image light may enter into the entrance pupil surface 121 of the regular lens unit 120 to form an image on the image sensor 123. Sequentially, a landscape in full-360° angle-in-view is acquired by the 360° viewing angle lens 10, once converted to an electric signal by the image sensor 123 of the regular lens unit 120, and can be displayed on a display device, e.g. a liquid crystal display (LCD), or a cathode-ray tube (CRT).

Detailed examples of the optical lens system 100 using the 360° viewing angle lens 10 are given below with an accompany table 1 and table 2, but it should be noted that the optical lens system 100 is not limited by these examples. Listed below are the symbols used in these detailed examples:

R: radius of curvature;
Nd: refractive index of lens; and
D: displacement between one center of one surface and another center of another surface next to the one surface on the second optical axis O2;
Vd: Abbe number.

TABLE 1

| Surface | R (mm) | D (mm) | Nd | Vd |
|---------|--------|--------|--------|-------|
| S1 | 13.21 | 10.3 | 1.5311 | 55.75 |
| S2 | −7.56 | −9 | — | — |
| S3 | −3.2 | 8.1 | — | — |
| S4 | −10.11 | 6.48 | — | — |
| S5 | −4.87 | 2.501 | 1.5311 | 55.75 |
| S6 | −3.92 | 2.51 | — | — |

In this embodiment, each surface of the 360° viewing angle lens 10 and the relay lens 12 is an aspherical surface. The aspherical surface is shaped according to the formula:

$$x = \frac{ch^2}{1 + \sqrt{1 - (k+1)c^2h^2}} + \sum A_i h^i$$

where h is a height from the optical axis of the 360° viewing angle lens 10 or the relay lens 12 to the aspherical surface, c is a vertex curvature, k is a conic constant, and Ai are i-th order correction coefficients of the aspherical surfaces. For example, $A_4$ is the 4th order aspherical coefficient of the aspherical surfaces, $A_6$ is the 6th order aspherical coefficient of the aspherical surfaces. The aspherical coefficient of the 360° viewing angle lens 10 and the relay lens 12 are shown in table 2:

TABLE 2

| Surface | K | $A_4$ | $A_6$ |
|---------|---------|--------------|--------------|
| S1 | 0.35 | 0 | 0 |
| S2 | −2.686 | −7.14478E−04 | 0 |
| S3 | −14.778 | −7.76933E−04 | 0 |
| S4 | −100 | 2.329132E−03 | 0 |
| S5 | — | −2.71740E−003 | −2.00099E−004 |
| S6 | — | −4.58202E−003 | 2.549446E−005 |

While various exemplary have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A 360-degree viewing angle lens unit, from the object side to the image side thereof, comprising:
   a 360-degree viewing angle lens comprising:
      an annular incident surface having a positive radius of curvature and symmetrically concentric around an optical axis of the lens unit, the annular incident surface, from the object side to the image side of the lens unit, comprising a first circular edge and a second circular edge;
      a first reflective surface having a positive radius of curvature and symmetrically concentric around the optical axis of the lens unit, the first reflective surface, from the image side to the object side of the lens unit, comprising a third circular edge and a fourth circular edge;

a second reflective surface having a negative radius of curvature, the second reflective surface symmetrically concentric around the optical axis of the lens unit and coaxial with the incident surface, the periphery of the second reflective surface joined together with the first circular edge;

an emitting surface having a positive radius of curvature, the emitting surface symmetrically concentric around the optical axis of the lens unit and coaxial with the first reflective surface, the periphery of the emitting surface joined together with the third circular edge of the first reflective surface; and a connecting surface shaped as a substantially plane and defined between the fourth circular edge and the second circular edge; and a relay lens having positive refractive power and aligned with the emitting surface, the relay lens configured for condensing image light output from the emitting surface.

2. The lens unit as claimed in claim 1, wherein the 360-degree viewing angle lens is made of plastic.

3. The lens unit as claimed in claim 1, wherein the incident surface is externally symmetrically concentric to the first reflective surface, while the emitting surface is externally symmetrically concentric to the second reflective surface, the incident surface and the emitting surface oppositely extend along the optical axis of the lens unit.

4. The lens unit as claimed in claim 1, wherein the incident surface tilts to the optical axis of the lens unit at a predetermined angle.

5. The lens unit as claimed in claim 1, wherein the incident surface is a convex surface projecting to the object side along the optical axis of the lens unit.

6. The lens unit as claimed in claim 5, wherein the first reflective surface tilts to the optical axis of the lens unit at a predetermined angle, and substantially opposite to the projecting direction of the incident surface.

7. The lens unit as claimed in claim 1, wherein the first reflective surface is a convex surface projecting to the image side along the optical axis of the lens unit.

8. The lens unit as claimed in claim 1, wherein each of the first reflective surface and the second reflective surface is coated with a reflective film.

9. The lens unit as claimed in claim 1, wherein the second reflective surface has a vertex on the optical axis of the lens unit, the second reflective surface is a concave surface toward the image side.

10. The lens unit as claimed in claim 1, wherein the emitting surface is a convex surface projecting to the image side along the optical axis of the lens unit.

11. The lens unit as claimed in claim 1, wherein the diameter of the first circular edge is smaller than that of the second circular edge, the diameter of the third circular edge is smaller than that of the fourth circular edge, the diameter of the fourth circular edge is substantially equal to that of the second circular edge.

12. The lens unit as claimed in claim 1, wherein the image light emitted in an area formed as measured from −10° to 40° relative to a line perpendicular to the optical axis of the lens unit is capable of hitting the annular incident surface and being reflected by the first and second reflective surfaces to the emitting surface.

13. The lens unit as claimed in claim 1, wherein the diameter of the connecting surface is larger than that of the fourth circular edge and the second circular edge.

14. The lens unit as claimed in claim 1, wherein the relay lens comprises a first surface concave toward the object side, and a second surface convex toward the image side, the radius of the curvature of the first surface is negative, while the radius of the curvature of the second surface is positive referring to a direction from the object side to the image side of the lens unit.

15. The lens unit as claimed in claim 14, wherein one of the first surface and the second surface is aspheric.

16. The lens unit as claimed in claim 1, further comprising a reflective element aligned with the relay lens and configured for reflecting the condensed image light emitted from the relay lens.

17. An optical lens system comprising:
a regular lens unit having a first optical axis; and
a 360-degree viewing angle lens unit having a second optical axis perpendicular to the first axis, the lens unit, from the object side to the image side thereof, comprising:
a 360-degree e viewing angle lens comprising:
an annular incident surface having a positive radius of curvature and symmetrically concentric around the second optical axis, the annular incident surface, from the object side to the image side of the lens unit, comprising a first circular edge and a second circular edge;
a first reflective surface having a positive radius of curvature and symmetrically concentric around the second optical axis, the first reflective surface, from the image side to the object side of the lens unit, comprising a third circular edge and a fourth circular edge;
a second reflective surface having a negative radius of curvature, the second reflective surface symmetrically concentric around the second optical axis and coaxial with the incident surface, the periphery of the second reflective surface joined together with the first circular edge; and
an emitting surface having a positive radius of curvature, the emitting surface symmetrically concentric around the second optical axis and coaxial with the first reflective surface, the periphery of the emitting surface joined together with the third circular edge of the first reflective surface;
a relay lens having positive refractive power and aligned with the emitting surface, the relay lens configured for condensing image light output from the emitting surface; and
a reflective element aligned with the relay lens and configured for reflecting the condensed image light emitted from the relay lens to the regular lens unit.

18. The optical lens system as claimed in claim 17, wherein the first optical axis and a reflective surface of the reflective element are arranged at an angle of 45 degrees, the second optical axis and the reflective surface of the reflective element are arranged at an angle of 45 degrees.

* * * * *